(12) United States Patent
Yukikata et al.

(10) Patent No.: US 10,888,960 B2
(45) Date of Patent: Jan. 12, 2021

(54) SOLDER ALLOY AND RESIN FLUX CORED SOLDER

(71) Applicant: KOKI Company Limited, Tokyo (JP)

(72) Inventors: Kazuhiro Yukikata, Tokyo (JP); Mitsuyasu Furusawa, Tokyo (JP); Kimiaki Mori, Tokyo (JP)

(73) Assignee: KOKI Company Limited, Tokyo (JP)

( * ) Notice: Subject to any disclaimer, the term of this patent is extended or adjusted under 35 U.S.C. 154(b) by 0 days.

(21) Appl. No.: 16/070,813

(22) PCT Filed: Sep. 30, 2016

(86) PCT No.: PCT/JP2016/078974
§ 371 (c)(1),
(2) Date: Jul. 18, 2018

(87) PCT Pub. No.: WO2018/008165
PCT Pub. Date: Jan. 11, 2018

(65) Prior Publication Data
US 2019/0184500 A1    Jun. 20, 2019

(30) Foreign Application Priority Data

Jul. 4, 2016 (JP) .................................. 2016-132816

(51) Int. Cl.
*B23K 35/26* (2006.01)
*C22C 13/00* (2006.01)
*B23K 35/02* (2006.01)
*B23K 35/36* (2006.01)

(52) U.S. Cl.
CPC ........ *B23K 35/262* (2013.01); *B23K 35/0266* (2013.01); *B23K 35/26* (2013.01); *B23K 35/3613* (2013.01); *C22C 13/00* (2013.01)

(58) Field of Classification Search
CPC ............................. B23K 35/262; C22C 13/00
USPC ........................................................... 148/24
See application file for complete search history.

(56) References Cited

U.S. PATENT DOCUMENTS

| | | |
|---|---|---|
| 2002/0117539 A1 | 8/2002 | Ito et al. |
| 2004/0112474 A1 | 6/2004 | Kato et al. |
| 2004/0141873 A1* | 7/2004 | Takemoto .......... B23K 35/0227 420/557 |
| 2005/0248020 A1 | 11/2005 | Kato et al. |
| 2009/0304545 A1 | 12/2009 | Tanaka et al. |
| 2012/0223430 A1 | 9/2012 | Terashima et al. |
| 2014/0054766 A1 | 2/2014 | Hashino et al. |
| 2016/0056570 A1 | 2/2016 | Yoshikawa et al. |

FOREIGN PATENT DOCUMENTS

| | | |
|---|---|---|
| CN | 105142856 | 12/2015 |
| EP | 1 213 089 | 6/2002 |
| EP | 1 410 871 | 4/2004 |
| JP | 2002-246742 | 8/2002 |
| JP | 2003-062688 | 3/2003 |
| JP | 2005-040847 | 2/2005 |
| JP | 2005-153007 | 6/2005 |
| JP | 2005-186149 | 7/2005 |
| JP | 2009-082986 | 4/2009 |
| TW | 200906529 | 2/2009 |
| WO | 2007/102589 | 9/2007 |
| WO | 2008/084603 | 7/2008 |

\* cited by examiner

*Primary Examiner* — Weiping Zhu
(74) *Attorney, Agent, or Firm* — Clark & Brody LP

(57) ABSTRACT

Provided is a solder alloy that contains 0.01 mass % or more and 0.1 mass % or less of Fe, 0.005 mass % or more and less than 0.02 mass % of Co, 0.1 mass % or more and 4.5 mass % or less of Ag, 0.1 mass % or more and 0.8 mass % or less of Cu, and the balance being Sn.

3 Claims, No Drawings

SOLDER ALLOY AND RESIN FLUX CORED SOLDER

CROSS-REFERENCE TO RELATED APPLICATION

This application claims priority to Japanese Patent Application No. 2016-132816, the disclosure of which is incorporated herein by reference in its entirety.

FIELD OF THE INVENTION

The present invention relates to a solder alloy and a resin flux cored solder that is formed using the solder alloy.

BACKGROUND ART

Conventionally, parts to be joined such as electronic parts or the like are joined to a substrate using a solder alloy. As the solder alloy, solder alloys composed of silver (hereinafter referred to also as Ag), copper (hereinafter referred to also as Cu), and a balance of tin (hereinafter referred to also as Sn) are known. As a method for joining parts to be joined and a substrate using a solder alloy, a manual soldering and a flow soldering are known.

In the manual soldering, a resin flux cored solder, in which flux is filled inside a solder alloy formed into a tubular shape, is used and is made to contact the tip of a soldering iron to melt the solder alloy, and thereafter the molten solder alloy (hereinafter referred to also as a molten solder) is fed to a joining area, at which a substrate and a part to be joined are to be joined together, and is allowed to solidify so that the substrate and the part to be joined are joined together.

In the flow soldering, a joining area between a part to be joined and a substrate, on which the part to be joined is mounted in advance, is immersed in a solder bath filled with the molten solder, or subjected to spraying with the molten solder fed from the solder bath, so that the substrate and the part to be joined are joined together.

As the soldering iron and the solder bath, for example, there are known those composed of a substrate that contains copper (hereinafter referred to also as Cu) as a main component, a plated layer that contains iron (hereinafter referred to also as Fe) as a main component and covers a surface of the substrate, and a protective layer that contains tin (hereinafter referred to also as Sn) as a main component and covers a surface of the plated layer to protect the plated layer.

In such a soldering iron and a solder bath, the protective layer disappears after repeated use (after repeated contacts with the molten solder) to cause the plated layer to be partly exposed on the surface. When the soldering iron or the solder bath is continued to be used in a state where the plated layer is exposed on the surface, iron that forms the plated layer spreads toward the molten solder layer as a result of the contact between the plated layer and the molten solder. The plated layer thereby gradually disappears and eventually the substrate is exposed on the surface. When the substrate is exposed, it is difficult to effectively melt the solder alloy, and it is thus necessary to change or repair the soldering iron or the solder bath.

In order to reduce such a troublesome work of changing or repairing, a method for suppressing disappearance of the plated layer has been proposed. There has been proposed a method for suppressing disappearance of the plated layer by, for example, incorporating a small amount of Fe in the solder alloy (see Patent Literature 1), or incorporating nickel (hereinafter referred to also as Ni) and cobalt (hereinafter referred to also as Co) or incorporating Fe, Ni, and Co in the solder alloy (see Patent Literature 2).

However, according to the method of incorporating Fe in the solder alloy, Fe is less likely to spread in Sn in the solder alloy, thereby allowing Fe to solely precipitate, and it is likely that a desired degree of the effect for suppressing disappearance of the plated layer cannot be obtained. According to the method of incorporating Ni and Co or incorporating Fe, Ni, and Co in the solder alloy in the manner as described above, Ni is less likely to spread in Sn in the solder alloy, and it is likely that the flowability of the molten solder is lowered and hence the wettability of the molten solder is lowered, by the incorporation of Ni.

CITATION LIST

Patent Literature

Patent Literature 1: JP 2003-062688 A
Patent Literature 2: JP 2005-153007 A

SUMMARY

Technical Problem

It is therefore an object of the present invention to provide a solder alloy that can effectively prevent disappearance of a plated layer even as a result of repeated contacts with the plated layer containing Fe as a main component in a molten state, and to provide a resin flux cored solder formed using the solder alloy.

Solution to Problem

A solder alloy according to the present invention consists of 0.01 mass % or more and 0.1 mass % or less of Fe, 0.005 mass % or more and less than 0.02 mass % of Co, 0.1 mass % or more and 4.5 mass % or less of Ag, 0.1 mass % or more and 0.8 mass % or less of Cu, and the balance being Sn.

The aforementioned solder alloy preferably contains 2.9 mass % or more and 3.1 mass % or less of Ag, and 0.45 mass % or more and 0.55 mass % or less of Cu.

A resin flux cored solder according to the present invention includes an exterior part having a tubular shape and formed of the solder alloy, and flux filled in a space inside the exterior part.

DESCRIPTION OF EMBODIMENTS

Hereinafter, embodiments of the present invention will be described.

A solder alloy of the present invention is composed of tin (hereinafter referred to also as Sn), iron (hereinafter referred to also as Fe), cobalt (hereinafter referred to also as Co), silver (hereinafter referred to also as Ag), and copper (hereinafter referred to also as Cu), in which Sn is a main component.

A content of Fe described above is 0.01 mass % or more and 0.1 mass % or less, preferably 0.02 mass % or more and 0.06 mass % or less. A content of Co described above is 0.005 mass % or more and less than 0.02 mass %, preferably 0.01 mass % or more and 0.019 mass % or less. A content of Ag described above is 0.1 mass % or more and 4.5 mass % or less, preferably 2.9 mass % or more and 3.1 mass % or less. A content of Cu described above is 0.1 mass % or more and 0.8 mass % or less, preferably 0.45 mass % or more and 0.55 mass % or less. Sn described above is a balance other than Fe, Co, Ag, and Cu described above. The balance is meant to be a component(s) other than Fe, Co, Ag, and Cu, and may contain inevitable impurities.

The solder alloy of the present invention can be used as a material constituting a resin flux cored solder used in the manual soldering. The resin flux cored solder is composed of an exterior part formed of the solder alloy having a tubular shape and flux filled in a space inside the exterior part.

The flux is not specifically limited. For example, rosin based flux, synthetic-resin flux, water soluble flux, or the like may be employed.

The resin flux cored solder can be produced by, for example, a method described below. Specifically, a cylindrical ingot made of the solder alloy is cut into two along an axial direction to form two ingot pieces having a concave shape. Then, flux is filled into a concave of one of the ingot pieces and subsequently the other ingot piece is joined to the one ingot piece to have a cylindrical shape. Then, the ingot filled with flux is pressed to have a reduced diameter, thereby forming a wire, and the wire is made to pass through a drawing die to form a resin flux cored solder with a desired diameter (for example, a diameter of about 0.8 mm).

An example of a method for joining a part to be joined such as electronic parts or the like to a substrate using the above-described resin flux cored solder includes a method described below. Specifically, a method includes making a resin flux cored solder to contact the tip of a soldering iron thereby melting a solder alloy, and feeding the molten solder alloy (hereinafter referred to also as a molten solder) to a joining area, at which a substrate and a part to be joined are to be joined together, thereby allowing the molten solder to solidify so that the substrate and the part to be joined are joined together (manual soldering).

As described above, the solder alloy and the resin flux cored solder that is formed using the solder alloy of the present invention can effectively prevent disappearance of a plated layer even as a result of repeated contacts with the plated layer containing Fe as a main component in a molten state.

That is, according to the present invention where the contents of Fe, Co, Ag, and Cu are in the above ranges and the balance is Sn, it is possible to suppress disappearance of the plated layer even as a result of repeated contacts with the plated layer containing Fe as a main component in a molten state.

Further, according to the present invention where the resin flux cored solder includes the exterior part having tubular shape formed of the solder alloy and flux filled in a space inside the exterior part, it is possible to effectively suppress disappearance of the plated layer even as a result of repeated operations where the resin flux cored solder is made to contact the solder iron having a plated layer containing Fe as a main component to thereby melt the solder alloy.

The solder alloy and the resin flux cored solder according to the present invention are not limited to the aforementioned embodiments, and various modifications can be made without departing from the gist of the present invention. Further, it is, of course, that the configurations, methods, or the like, of the above-described plurality of embodiments may be optionally employed and combined (configuration, method, or the like, of one embodiment may be applied to configuration, method, or the like, of another embodiment).

The aforementioned embodiments are described by taking, for example, the case where the solder alloy according to the present invention is used in the manual soldering, but is not limited thereto, and the solder alloy may be used in the flow soldering. In such a case, the solder alloy is kept in a heated and molten state in a solder bath. This method includes immersing the joining area between a substrate and a part to be joined, on which the part to be joined is mounted in advance, in a solder bath filled with the molten solder, or spraying the molten solder fed from the solder bath to the joining area, so that the substrate and the part to be joined are joined together (flow soldering).

EXAMPLES

Hereinafter, examples of the present invention will be described. However, the present invention is not limited to the following examples.

Examples 1 and 2, Comparative Examples 1 and 2

1. Solder Alloy
Solder alloys were prepared to respectively have compositions of Table 1 below.
2. Resin Flux Cored Solder
Resin flux cored solders in a diameter of 0.8 mm were prepared using the solder alloys prepared in the above step. The content of flux in the resin flux cored solders was 3.2 wt %. As the flux, 72M flux (manufactured by KOKI COMPANY LIMITED) was employed.
3. Disappearance Rate of Plated Layer
A soldering iron tip (manufactured by Japan Unix Co., Ltd., product name: P3D-R) having a plated layer, of which a main component is Fe, was heated at 400° C., followed by repeatedly feeding the resin flux cored solder prepared in the above step to the soldering iron tip. A fed amount for one time was 0.018 g. After feeding of the resin flux cored solder was repeated 10,000 times, a cross section of the soldering iron tip was observed, and a thickness of the plated layer was measured. Then, the disappearance rate of the plated layer was calculated from formula 1 below.

$$\text{Disappearance rate of plated layer (\%)}=(A-B)/A\times100 \quad (1)$$

(A represents an original thickness of the plated layer, and B represents a thickness of the plated layer after feeding of the resin flux cored solder was repeated 10,000 times.)

TABLE 1

| | Composition of solder alloy (mass %) | | | | | Disappearance ratio of plated layer (%) |
|---|---|---|---|---|---|---|
| | Fe | Co | Ag | Cu | Sn | |
| Example 1 | 0.04 | 0.015 | 3.0 | 0.5 | balance | 3.72 |
| Example 2 | 0.02 | 0.010 | 3.0 | 0.5 | balance | 4.90 |
| Comparative Example 1 | — | — | 3.0 | 0.5 | balance | 28.25 |
| Comparative Example 2 | 0.04 | 0.040 | 3.0 | 0.5 | balance | 13.12 |

SUMMARY

As shown in Table 1 above, Examples 1 and 2 show the disappearance rates of the plated layer are lower than those of Comparative Examples. That is, the solder alloy with the contents of Fe, Co, Ag, and Cu in the above ranges and the balance of Sn can suppress disappearance of the plated layer even as a result of repeated contacts with the plated layer containing Fe as a main component. The same effect was found when the content of the flux was 4.5%. That is, it is possible to suppress disappearance of the plated layer without the influence of the content of the flux in the resin flux cored solder.

The invention claimed is:

1. A solder alloy consisting of 0.01 mass % or more and 0.1 mass % or less of Fe, 0.01 mass % or more and 0.015 mass % or less of Co, 0.1 mass % or more and 4.5 mass % or less of Ag, 0.1 mass % or more and 0.8 mass % or less of Cu, and the balance being Sn.

2. The solder alloy according to claim 1 comprising 2.9 mass % or more and 3.1 mass % or less of Ag, and 0.45 mass % or more and 0.55 mass % or less of Cu.

3. A resin flux cored solder comprising an exterior part having a tubular shape and formed of the solder alloy according to claim 1, and flux filled in a space inside the exterior part.

* * * * *